United States Patent
Grove et al.

(10) Patent No.: US 10,619,350 B2
(45) Date of Patent: Apr. 14, 2020

(54) CONNECTION APPARATUS AND METHOD (71) Applicant: Christie Lites Enterprises Canada Inc., Toronto, Ontario (CA)

(72) Inventors: Michael Grove, Orlando, FL (US); Huntly Gordon Christie, Orlando, FL (US)

(73) Assignee: Christie Lites Enterprises Canada Inc., Toronto (CA)

( * ) Notice: Subject to any disclaimer, the term of this patent is extended or adjusted under 35 U.S.C. 154(b) by 0 days.

(21) Appl. No.: 16/249,552

(22) Filed: Jan. 16, 2019

(65) Prior Publication Data
US 2019/0323236 A1    Oct. 24, 2019

(51) Int. Cl.
*E04C 3/02*    (2006.01)
*F16B 33/00*    (2006.01)
*F16B 35/00*    (2006.01)

(52) U.S. Cl.
CPC .............. *E04C 3/02* (2013.01); *F16B 33/002* (2013.01); *F16B 35/00* (2013.01)

(58) Field of Classification Search
CPC ........... E04C 3/02; F16B 35/00; F16B 33/002
See application file for complete search history.

(56) References Cited

U.S. PATENT DOCUMENTS

| 134,963 | A | * | 1/1873 | Wingate | F16B 33/002 411/166 |
|---|---|---|---|---|---|
| 1,649,071 | A | | 11/1927 | Lowe | |
| 3,263,728 | A | | 8/1966 | Lynch | |
| 4,915,557 | A | | 4/1990 | Stafford | |
| 4,941,789 | A | * | 7/1990 | Sims | B01D 35/30 220/327 |
| 4,974,888 | A | * | 12/1990 | Childers | F16B 37/0857 292/251 |
| 5,040,917 | A | * | 8/1991 | Camuffo | B62D 21/09 403/408.1 |
| 5,197,817 | A | | 3/1993 | Wood et al. | |
| 5,743,692 | A | * | 4/1998 | Schwarz | F16B 41/002 411/107 |
| 5,855,463 | A | | 1/1999 | Newby | |

(Continued)

FOREIGN PATENT DOCUMENTS

EP    15443792    6/2005

*Primary Examiner* — Patrick J Maestri
(74) *Attorney, Agent, or Firm* — DLA Piper LLP (US)

(57) ABSTRACT

A connection apparatus for attaching a first truss to a second truss has a first and second connection segment, a bolt and an optional spring. The first connection segment has an aperture dimensioned to receive the threaded end and the shank of the bolt. The aperture is also dimensioned to prevent the head end of the bolt and the threaded end from passing through, and the aperture comprising a recess for receiving the second end of the spring. The first connection segment also has a side opening, open to the aperture, dimensioned to receive the shank of the bolt. The first connection segment also has a shoulder portion within the aperture dimensioned to closely fit around the shank of the bolt and prevent the threaded end of the bolt from passing therethrough. The second connection segment for attaching to the second truss has a threaded hole dimensioned to fixably receive the threaded end of the bolt.

11 Claims, 11 Drawing Sheets

(56) References Cited

U.S. PATENT DOCUMENTS

| | | | |
|---|---|---|---|
| 6,027,294 A * | 2/2000 | Newby | B65D 41/0471 |
| | | | 411/231 |
| 6,676,874 B1 * | 1/2004 | Muller | F16B 33/008 |
| | | | 264/249 |
| 6,761,521 B2 | 7/2004 | McCormack et al. | |
| 7,938,607 B2 * | 5/2011 | Wang | F16B 5/0208 |
| | | | 411/107 |
| 8,087,861 B2 * | 1/2012 | Wang | B23K 1/0008 |
| | | | 411/107 |
| 8,132,767 B2 | 3/2012 | Oh et al. | |
| 9,080,655 B2 | 7/2015 | Cronin et al. | |
| 10,411,454 B2 * | 9/2019 | Bundren | H02G 7/02 |
| 2011/0133451 A1 * | 6/2011 | Singh | F01N 13/1805 |
| | | | 285/405 |
| 2014/0086703 A1 | 3/2014 | Thommes | |
| 2014/0147228 A1 * | 5/2014 | Kobayashi | F16B 31/02 |
| | | | 411/103 |
| 2015/0071730 A1 * | 3/2015 | Tseng | F16B 5/0208 |
| | | | 411/318 |
| 2018/0272514 A1 * | 9/2018 | Pergantis | B25D 1/16 |
| 2019/0055971 A1 * | 2/2019 | Maloney | F16B 5/0208 |

* cited by examiner

CONNECTION APPARATUS AND METHOD

CROSS REFERENCE TO RELATED APPLICATIONS

This application is a U.S. Non-provisional Application claims priority from Canadian Patent Application No. 3,002,006 filed Apr. 18, 2018, which its entirety is incorporated herein by reference.

FIELD OF TECHNOLOGY

The present disclosure generally relates to an apparatus and method for connecting truss sections to provide a single truss structure.

BACKGROUND

Connection apparatus may be used in a variety of applications and industries. In one application, connection apparatus may be used to interconnect truss sections. Truss sections are used in a variety of industries, including the entertainment industry, where they are used for the construction of truss structures for mounting lighting, cameras, displays, and speaker systems. Truss structures are commonly used in entertainment (and in particular concert) or trade show venues for this purpose. Each time they are used, truss structures are assembled from individual truss sections. Once a concert, festival, or trade show has concluded the truss structures are disassembled and the truss sections are transported to other venues or to storage facilities.

Although some means are needed to secure lighting, sound, camera, and display equipment for concerts, not all entertainment venues are equipped with such means. Accordingly, in some cases truss sections are transported to the venue and a truss structure is assembled on site. Because renting of a venue is costly, it is desirable for truss structures to be assembled and disassembled quickly to minimize rental costs. Assembling such a truss structure can be large and complex job.

Truss structures are typically constructed by placing truss sections adjacent to one another and joining them together. In order to form a single unitary whole, each truss section comes equipped with a mechanism by which it may be connected to other truss assemblies. The connecting mechanism comprises a set of connection openings that may be aligned as between separate truss assemblies and through which connection hardware, such as pins or threaded bolts, may be inserted to create firm connection points.

Truss sections are normally shipped out to venues from a central storage facility or possibly from a number of disparate storage facilities. Connection hardware must be present at the venue in order for the truss sections to be assembled.

The connection hardware and fasteners are quite small as compared to the truss sections and as a result may be stored separately from the truss sections. Alternatively, the disassembler may choose to reattach the connection hardware to the truss for storage by reinserting the connection hardware into the connection opening of a truss section after disassembly. Where a truss structure has many connections, reinserting the connection hardware can significantly increase disassembly time.

When reinserting the connection hardware, the disassembler may decide to attach the connection hardware to either one of the two truss sections. This may lead to an inconsistency in how the connection hardware is stored with respect to the truss sections. This inconsistency is exacerbated by the fact that sometimes truss sections will be connected to other sections at both ends or other locations and sometimes there will only be a connection at one end.

The inconsistency in the storage of the connection hardware creates a possible problem wherein there is a chance or likelihood that truss sections being delivered to a venue may not arrive with the appropriate connection hardware. The lack of appropriate connection hardware may not be discovered until the truss sections arrive at the venue, leading to a delay and increase in the time required to assemble the truss structure.

BRIEF DESCRIPTION OF THE DRAWINGS

The following drawings illustrate examples of the components, and are for illustrative purposes only. Other embodiments that are substantially similar can use other components that have a different appearance.

DETAILED DESCRIPTION

The present disclosure relates to a truss connection apparatus to allow efficient assembly of truss structures.

A connection apparatus for attaching a first truss to a second truss is described. The connection apparatus comprises a bolt, a spring and a first connection segment and a second connection segment. The bolt comprises a threaded end, a head end opposite the threaded end; and a shank between the head end and the threaded end. The coil spring has a hollow portion for receiving the threaded end and the shank of bolt, wherein the spring is dimensioned to prevent the head end of fastener from passing through the hollow portion, and wherein the spring comprises a first end for engaging the head end of the bolt and a second end. The first connection segment for attaching to the first truss has an aperture dimensioned to receive the threaded end and the shank of the bolt, the aperture being dimensioned to prevent the head end of the bolt and the threaded end from passing through, and the aperture comprising a recess for receiving the second end of the spring. The first connection segment also has a side opening, open to the aperture, dimensioned to receive the shank of the bolt. The first connection segment also has a shoulder portion within the aperture dimensioned to closely fit around the shank of the bolt and prevent the threaded end of the bolt from passing therethrough. When the threaded end and the shank of the bolt is positioned within the hollow portion of the spring and the second end of the spring is positioned within the recess of the first connection segment, the bolt and spring are restricted form axial movement relative to the first connection segment by engagement of the first end of the spring with the head end of the bolt and the second end of the spring with the recess of the first connection segment, the bolt and spring are further restricted from lateral movement relative to the first connection segment by engagement of the second end of the spring with the recess of the first connection segment. The second connection segment for attaching to the second truss has a threaded hole dimensioned to fixably receive the threaded end of the bolt.

Figure 1:
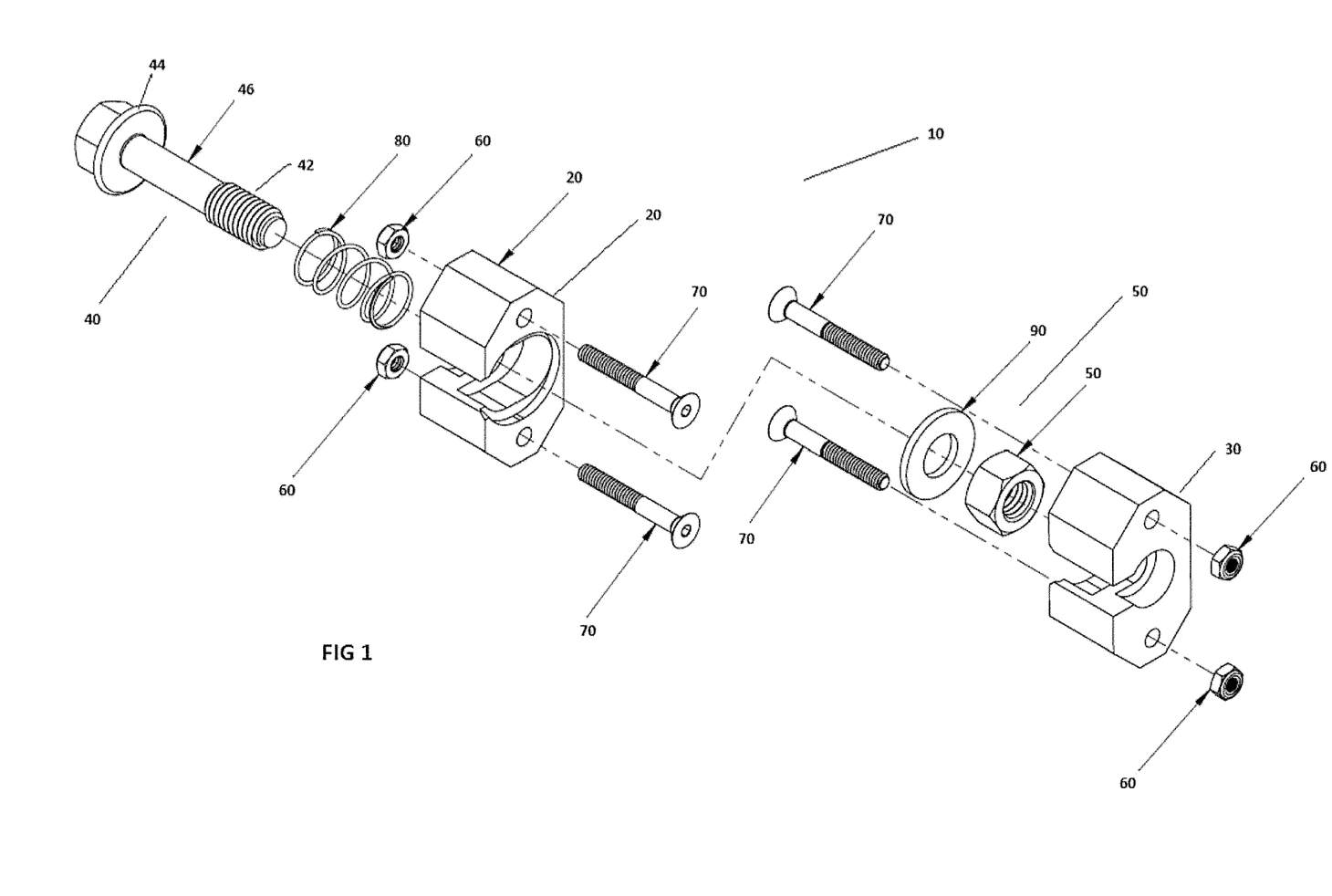
FIG. 1 is an exploded isometric view of an embodiment of a connection apparatus comprising a first connection segment and a second connection segment.

Reference will now be made to FIG. 1, which provides an exploded isometric view of an embodiment of a connection apparatus 10. Connection apparatus 10 comprises a first connection segment 20, a second connection segment 30, a first fastener 40, and a second fastener 50. In this embodiment, first fastener 40 is a threaded fastener with an external male thread (e.g., a bolt) and second fastener 50 (e.g., a nut) has a threaded hole for receiving the first fastener. Bolt 40 comprises a threaded portion 42, a shank 46, and a bolt head 44. In the embodiment referenced in FIG. 1, the first connection segment 20 may be fastened to a first truss which is to be joined with a second truss. The first connection segment 20 may be fastened to the first object using paired fasteners 60 and 70. In the embodiment shown in FIG. 1, fastener 60 is a nut and fastener 70 is a bolt. A plurality of fasteners 60, 70 may be used, such as using two such pairs of fasteners, as referenced in FIG. 1. Other means of fastening the first connection segment to an truss may be used, such as self-tapping screws, or machine screws in tapped holes, welding, or adhesive. As described in more detail, the bolt and nut are held captive by the first and second segments being fastened to the truss. In a further embodiment, the first connection segment 20 may be integral with the first truss, or built into the body of the first object.

The second connection segment 30 may similarly be fastened to the second truss using fasteners 60 and 70. Other means may be used to fasten the second connection segment 30 with the second truss. In a further embodiment, the second connection segment 30 may be integral with the second truss, or built into the body of the second object. In still a further embodiment, the first and second objects may be two parts of the same truss. Nut 50 comprises a threaded hole for receiving the bolt 40.

Although the present disclosure is not limited to any one particular use, it will refer to interconnecting truss structures.

Figure 2A:
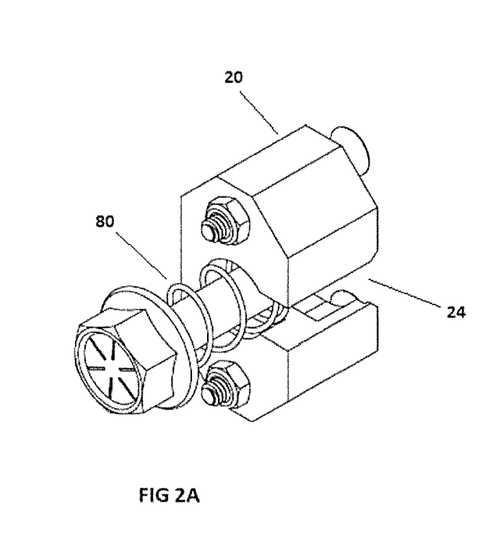
FIG. 2A is an isometric view of the first connection segment of FIG. 1 with the spring in an uncompressed state.
Figure 3A:
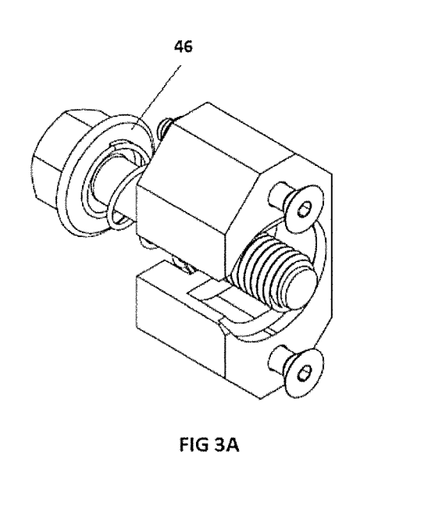
FIG. 3A is a different isometric view of the first connection segment of FIG. 2A.
Figure 4A:
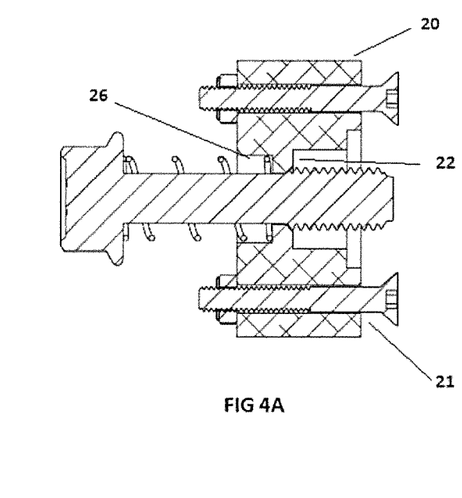
FIG. 4A is a side sectional view of the first connection segment of FIG. 2A.

Reference will now be made to FIGS. 2A, 3A, and 4A which respectively provide isometric and side views of a first connection segment 20, bolt 40, spring 80, and fasteners 60 and 70 when the spring is expanded. First connection segment 20 comprises an opening 24 (FIG. 2A). The opening comprises a narrower portion 22, or shoulder (shown in FIG. 4A) which is dimensioned to closely fit around the shank 46 of bolt 40. The threaded portion 42 and bolt head 44 of bolt 40 are wider in diameter than the shank 46 and the width of the narrower portion 22 of the first connection segment 20. As such, the bolt 40 may be placed into the opening 24 by first aligning the shank 46 with the narrower portion 22 and sliding, in a direction perpendicular to the bolt axis, the bolt 40 into the opening 24. Once the bolt 40 is inside the opening 24, the bolt has a limited range of axial movement within the opening as the narrower portion 22 is narrower than both the threaded portion 42 and bolt head 44 of bolt 40.

A spring 80 may be provided to secure the bolt 40 within the body of the first connection segment 20 by biasing the bolt axially towards to head of the bolt 44. The spring 80 may also reduce the movement of the bolt 40 such as rattling during movement and bias the bolt 40 within the first connection segment so the shaft of the bolt is less likely to protrude from the truss and interfere with placement of the truss during transport, storage and assembly. The spring is optional but will be included in the description of the embodiment.

In operation, one end of the spring 80 abuts against the bolt head 44. The other end of the spring 80 is biased against a lip formed by the narrower portion 22 of the first connection segment. The spring 80 thus limits the bolt 40 from axial movement relative to the first connections segment 20. As previously mentioned, the first connection segment may be integral with or built into the object to be attached.

When it its biased expanded stated, the spring 80 also restricts the bolt 40 from side-to-side movement. The spring 80 is coil spring wrapped around the bolt 40. The first connection segment 20 comprises a recess 26 (referenced in FIG. 4A) for receiving the spring 80. The diameter of the recess 26 is dimensioned to contain the spring 80 and restrict side-to-side movement when the spring 80 is within the recess 26. In this embodiment, the recess 26 is slightly larger in diameter than the spring 80. Accordingly, when the bolt 40 and the expanded spring 80 are both captured by the first connection element 20 (shown in FIG. 2A), both the bolt and spring are prevented from axial and side-to-side movement of the bolt 40 relative to the first connection element 20.

In this embodiment, the bolt 40 may be dimensioned such that a portion of the threaded portion 42 of the bolt 40 is exposed (referenced in FIG. 4A) and extends externally from the body of the first connection segment 20.

Figure 2C:
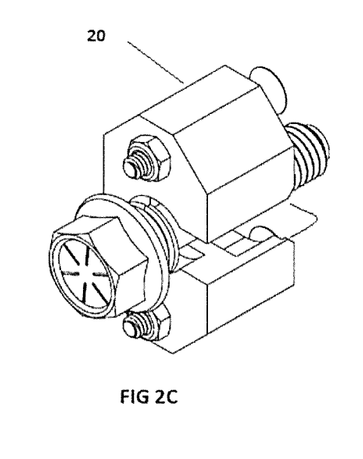
FIG. 2C is an isometric view of the first connection segment of FIG. 1 with the spring in a fully compressed state and the bolt head being spaced apart from the surface of the connection segment.

To remove the bolt 40 from the first connection segment 20, the bolt and spring may be manually manipulated. FIGS. 2C, 3C, and 4C illustrate the bolt 40, spring 80, and first connection segment 20 where the spring 80 is compressed and the bolt head 44 is spaced apart from the first connection segment 20 when manually manipulated. As referenced in FIG. 4C, when the spring 80 is compressed manually and the bolt head 44 is spaced apart from the first connection segment 20, the spring 80 is outside the recess 26 of the first connection segment 20. In this orientation, spring 80 and bolt 40 are able to move side-to-side (i.e., perpendicular to the axis of bolt 40), and the threaded portion 40 is clear of the first connection segment, accordingly, bolt 40 may be removed from the first connection segment by sliding the bolt out of the side opening 24 of the first connection segment 20. When the spring is manually manipulated, the bolt may be removed, replaced or installed in this manner.

Figure 2B:
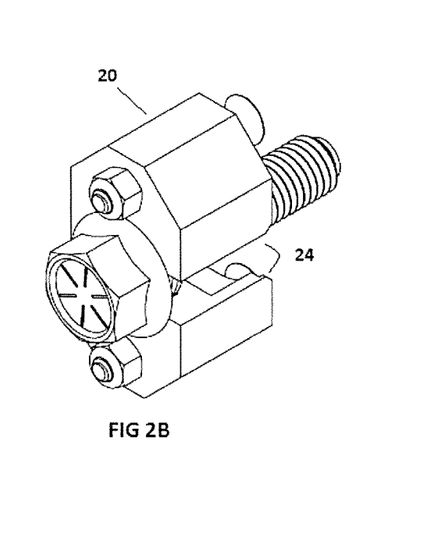
FIG. 2B is an isometric view of the first connection segment of FIG. 1 with the spring in a fully compressed state and the bolt head being flush with the surface of the connection segment.
Figure 3B:
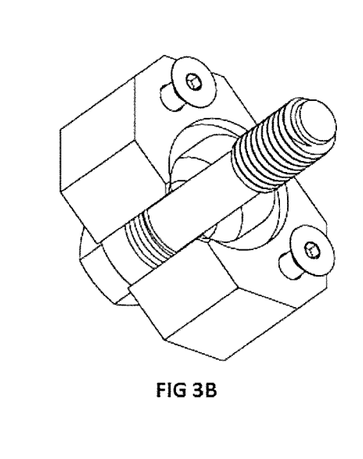
FIG. 3B is a different isometric view of the first connection segment of FIG. 2B.
Figure 3C:
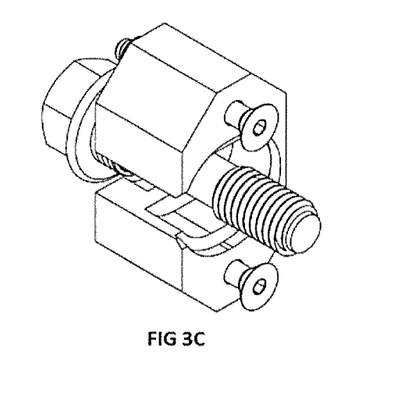
FIG. 3C is a different isometric view of the first connection segment of FIG. 2C.
Figure 4B:
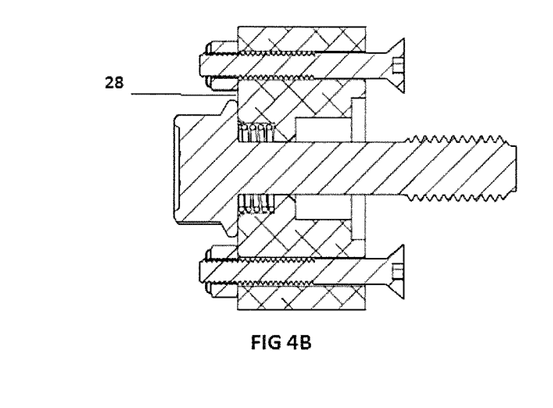
FIG. 4B is a side sectional view of the first connection segment of FIG. 2B.
Figure 4C:
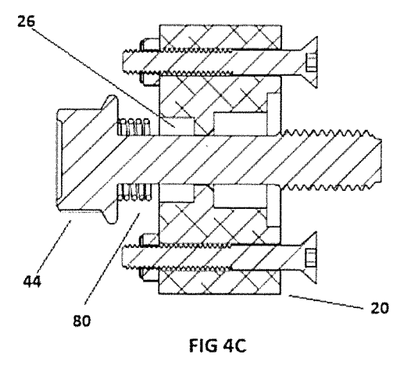
FIG. 4C is a side sectional view of the first connection segment of FIG. 2C.

FIGS. 2B, 3B, and 4B illustrate the relative orientation of the bolt 40, spring 80, and first connection segment 20 when the bolt 40 abuts the surface 28 of the first connection segment 20, such as when the bolt (and nut, not shown in FIGS. 2B, 3B and 4B) are tightened and the bolt is fastening the first truss with the second truss. In this orientation, the spring 80 is compressed within the recess 26 of the first connection segment 20 and restricts the bolt 40 from side to side movement relative to the first connection segment 20. Accordingly, so long as a portion of the spring 80 is within recess 26 of the first connection segment, the spring 80 and bolt 40 are restricted from side to side movement. To allow the bolt 40 to be removed from the first connection segment via the side opening 24, the spring 80 must be manipulated such that it is outside of the recess 26.

Figure 5:
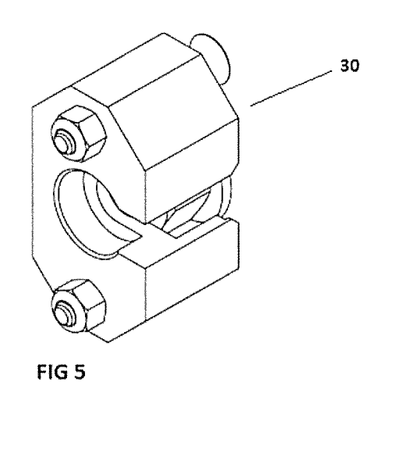
FIG. 5 is an isometric view of the second connection segment.
Figure 6:
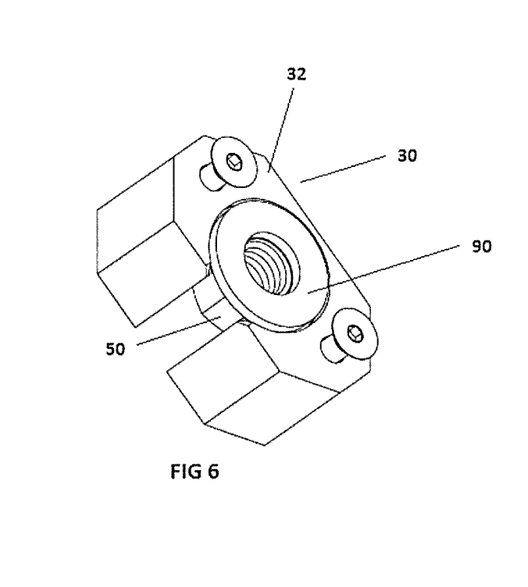
FIG. 6 is a different isometric view of the second connection segment of FIG. 5.
Figure 7:
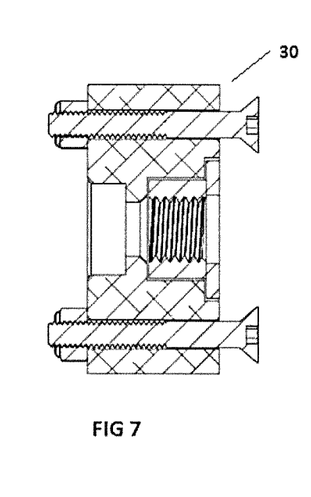
FIG. 7 is a side sectional view of the second connection segment of FIG. 5.

FIGS. 5, 6, and 7 illustrate an embodiment of the second connection segment 30. Second connection segment comprises a recess for receiving the nut 50 and washer 90. The nut 50 comprises a threaded hole for receiving a corresponding fastener, such as bolt 40. In this embodiment, the recess is dimensioned to receive the nut 50 and washer 90, such that the washer is flush with the bottom surface 32 of the second connection segment (see FIG. 7). As previously mentioned, the second connection segment 30 may be integral with or built into a truss to be attached to a first connection segment 20. The recess receives the nut 50 and constrains the nut from rotating making the nut a captive nut, particularly when the second connection segment is fixed to the second truss.

Figure 8:
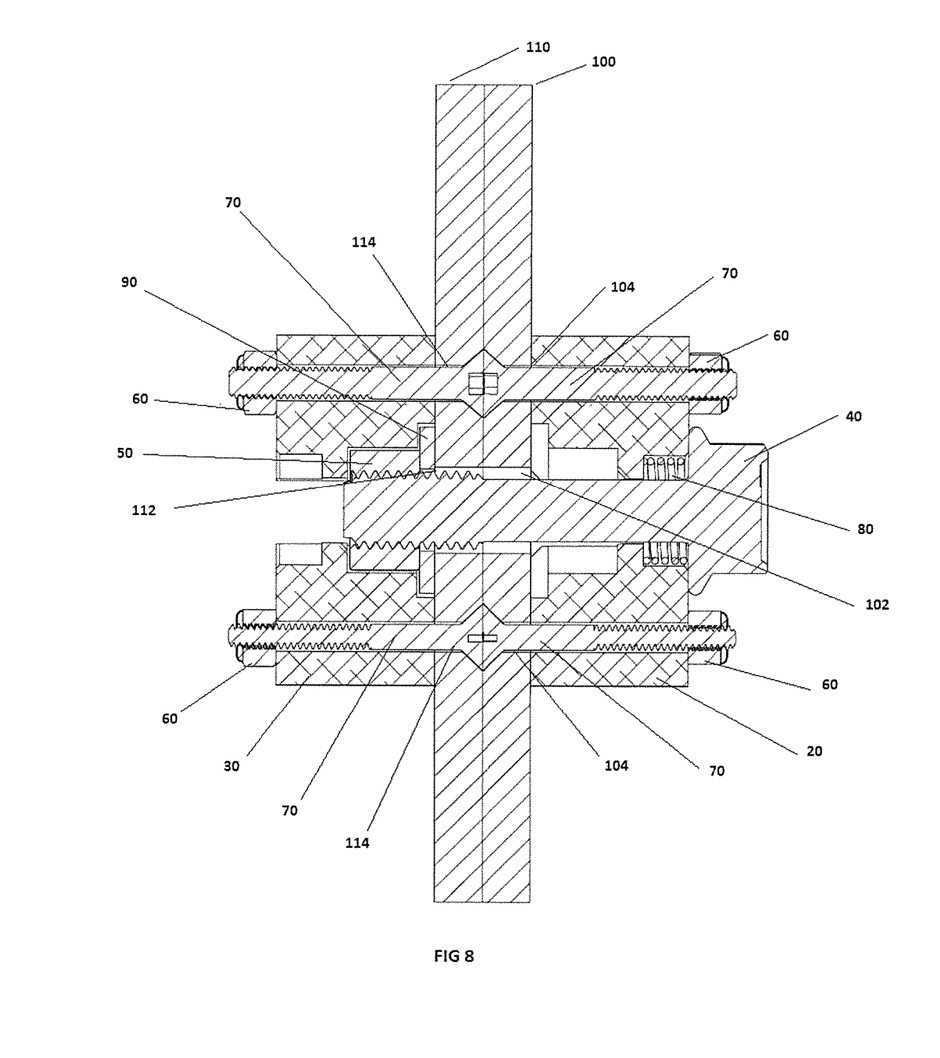
FIG. 8 is a side sectional view of the first connection segment of FIG. 2A and the second connection segment of FIG. 5 interconnected by a fastener.

FIG. 8 illustrates a side sectional view of the embodiment shown in FIG. 1 is it would appear when the first connection segment 20 and the second connection segment 30 are used to attach a first truss 100 and a second truss 110. In this embodiment, first truss 100 and second truss 110 each respectively comprise a pair of holes (104 and 114) for fasteners 60 and 70 and a bolt hole (102 and 112) for bolt 40. The first connection segment 20 and second connection segment 30 are respectively attached to a first truss 100 and second truss 110 using fasteners 60 and 70.

Before the first connection segment 20 is attached to the first object 100, the bolt 40 and spring 80 are installed with the first connection segment. After the first connection segment 20 is attached to the first truss 100, a part of the threaded portion 42 of bolt 40 may protrude from the surface of first object truss. This may be used to help with aligning the first truss 100 and second truss 110 for attachment. In this embodiment, once the first connection segment 20 is attached to the first truss 100, the bolt 40 and spring 80 may not be removed, except by removing the entire first connection segment 20 from the first truss 100. In this way the bolt is prevented from being separated from the first truss 100. In other embodiments (not shown), the first truss 100 may comprise an opening which would allow the bolt 40 and spring 80 to be removed through the manual manipulation discussed above.

Before the second connection segment 30 is attached to the second object 110, the nut 50 and washer 90 are placed in the recess of the second connection segment. Once the second connection segment 30 is attached, the nut 50 and washer 90 are captured by the surface of the second object 110 and the recess thereby preventing those components from being separated from the assembly.

Once the first connection segment 20 and second connection segment 30 are attached to their respective objects, all of the components of the connection apparatus 10 are captured with the objects. This prevents the components (such as nuts, bolts, fasteners, and springs) from being lost while the trusses are being transported, stored, assembled or disassembled. Providing all of the assembly hardware needed for assembly of the truss structure with the truss sections themselves may prevent components from being lost. Additionally, there may be a reduction in the time needed to assemble the trusses because the connection hardware does not need to be separately identified and provided. There is also reduced risk that truss sections are transported to the venue with insufficient assembly hardware to assemble the truss structure.

In the embodiments illustrated in FIG. 1-8, first connection segment 20 and second connection segment 30 are identical. Making the first and second connection segments identical simplifies the tooling and manufacturing required to produce the connection apparatus as well as simplify installing of the first and second segments on trusses with their captured nuts and bolts. Other embodiments may comprise first and second connections segments which are not identical.

To attach the first object 100 to the second object 110, the respective bolt holes 102 and 112 are lined up and the first object 100 and second object 110 are brought close to one another. By aligning the respective bolt holes 102 and 112 of the first object 100 and second object 110, the threaded hole of nut 50 and the bolt 40 should be aligned thus allowing the bolt 40 to be threaded to the nut 50. The bolt 40 may be tightened using an appropriate driver, such as a wrench. As the bolt 40 is tightened, spring 80 is compressed. As nut 50 is captured by second connection segment 30 and unable to rotate, a second wrench is not required, and the trusses may be fastened together using only a single wrench.

Figure 9:
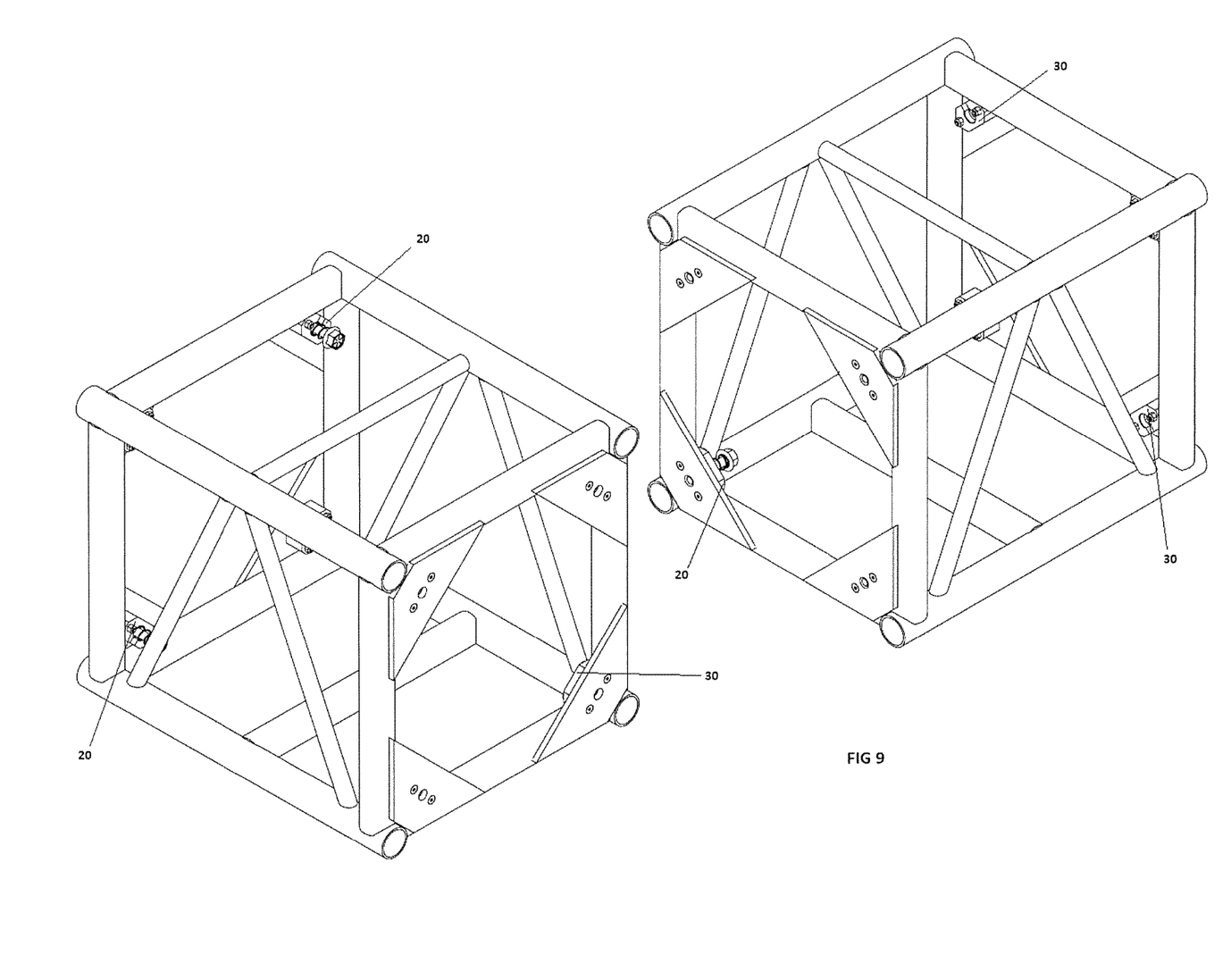
FIG. 9 is an isometric view of portions of truss sections comprising first connection segments and second connection segments attached thereto.
Figure 10:
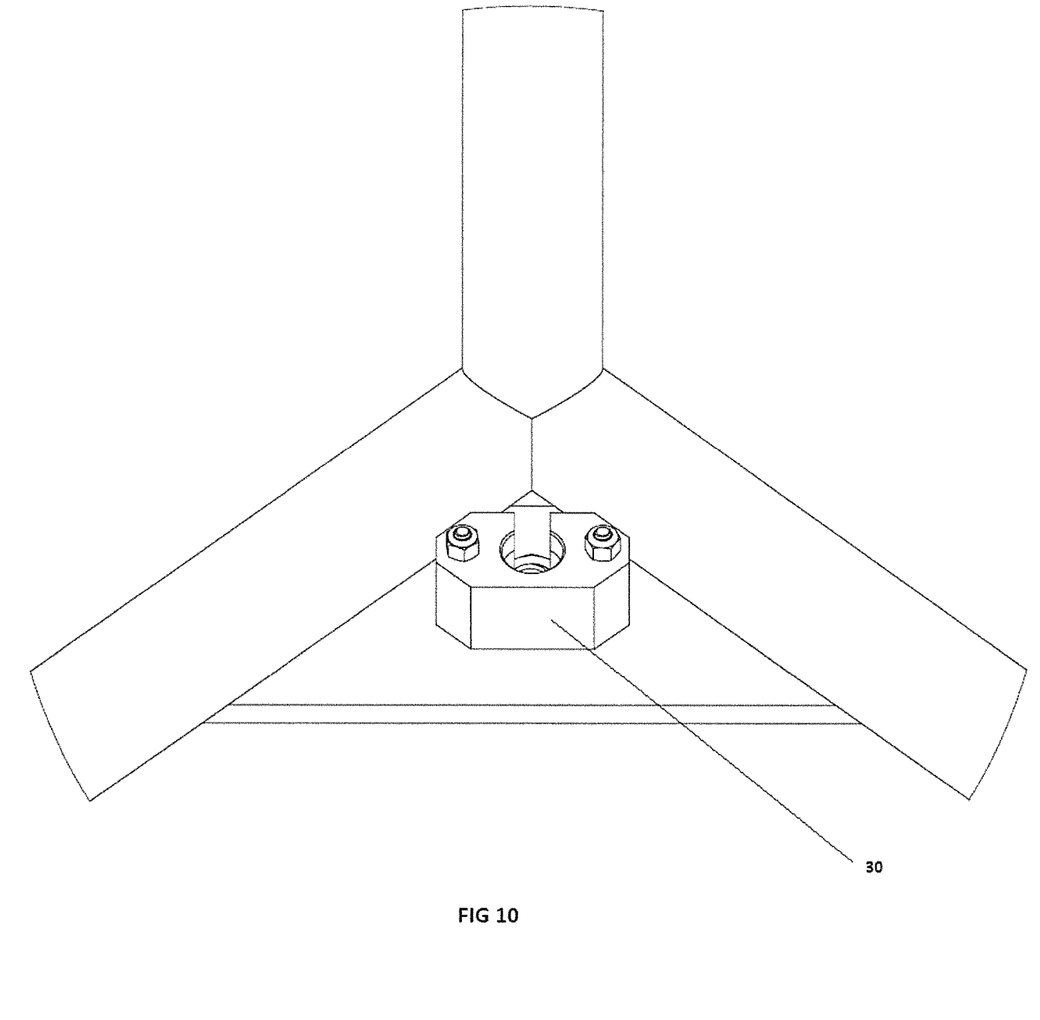
FIG. 10 is an isometric view of a portion of a truss section comprising a first connection segment attached thereto.
Figure 11:
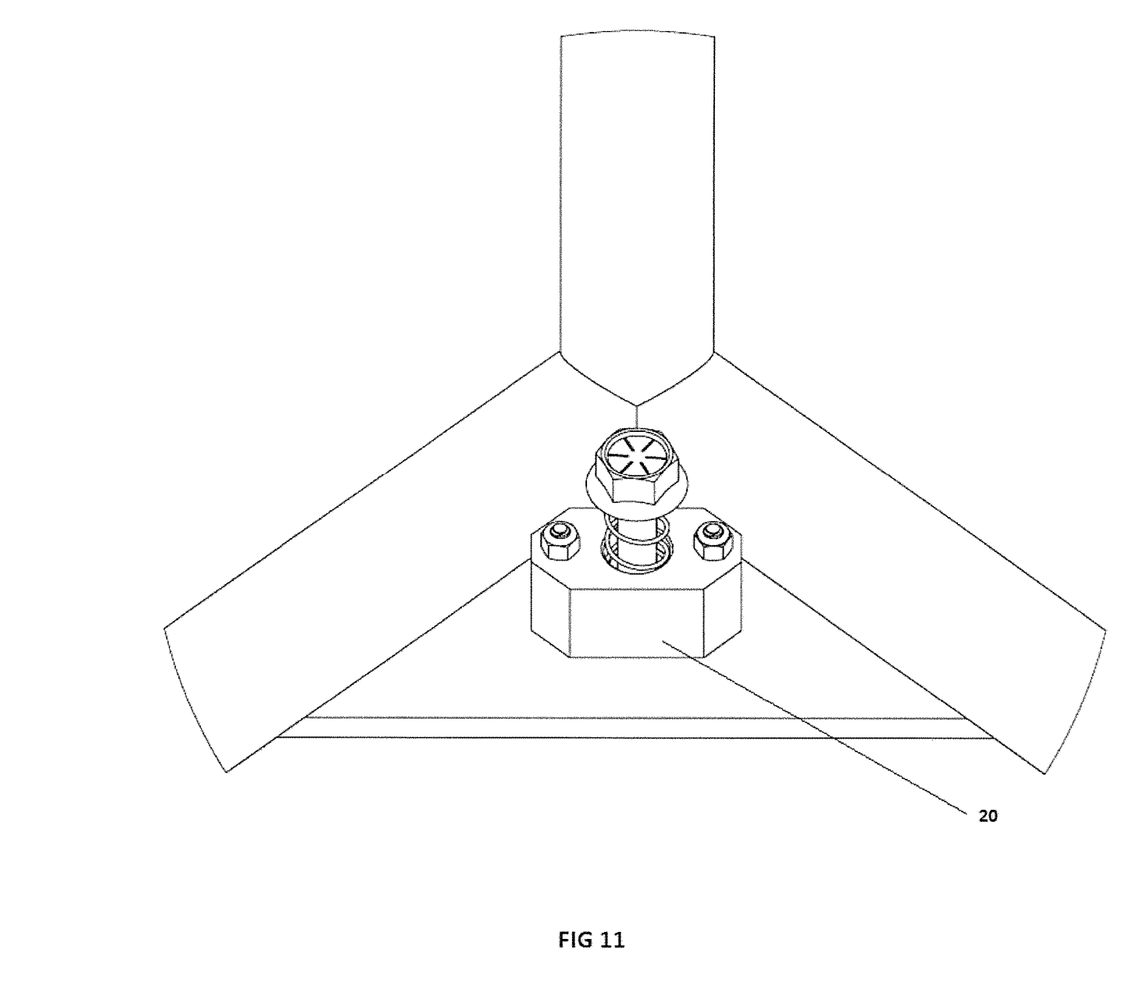
FIG. 11 is an isometric view of the truss section and first connection segment illustrated in FIG. 10, further comprising a fastener and a spring.

Each truss may be provided with one or more connection segments. FIG. 9 illustrates a plurality of first and second connection segments (20 and 30) which are attached to a pair of truss sections. In this embodiment, each end of a truss section comprises four connection segments. First connection segments 20 are provided on one end of the truss section, while second connection segments 30 are provided on the other end of the truss section. FIG. 10 illustrates a second connection segment 30 attached to a truss section. FIG. 11 illustrates a first connection segment 20 attached to a truss section.

Figure 12:
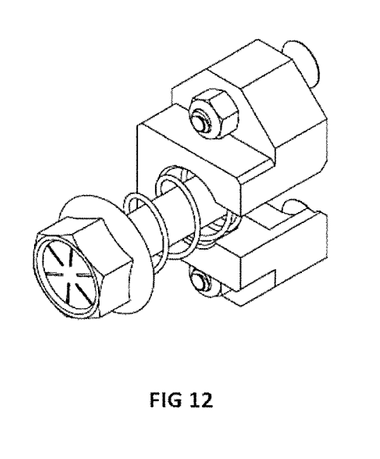
FIG. 12 is an isometric view of a further embodiment of a first connection segment.
Figure 13:
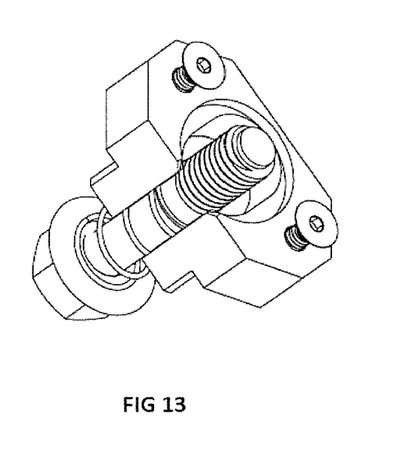
FIG. 13 is a different view of the first connection segment of FIG. 12.
Figure 14:
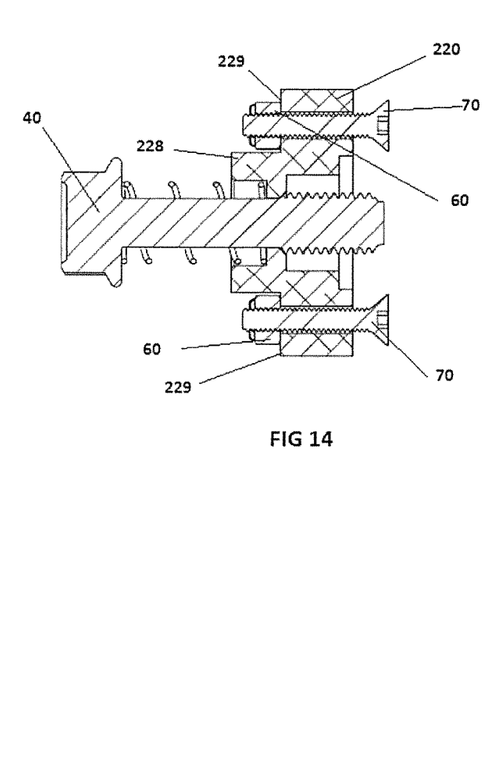
FIG. 14 is a side sectional view of the first connection segment of FIG. 12.

With reference to FIGS. 12, 13 and 14, an embodiment of the first connection segment 220 may comprise depressions 229 to either side of the hole through which bolt 40 passes. With reference to FIG. 14, the surface 228 of the first connection segment 220 which abuts the head of the nut 44 when the nut is tightened is spaced apart and elevated from the depressions 229, with reference to the truss on which the segment is fixed. Nuts 60 or other means 70 of fastening the connection segment to the truss may be contained within the depression 229. During tightening of the bolt 40, the difference in elevation allows bolt 40 to be tightened without the fasteners 60 potentially getting in the way of the tools being used the tighten the bolt 40.

Figure 15:
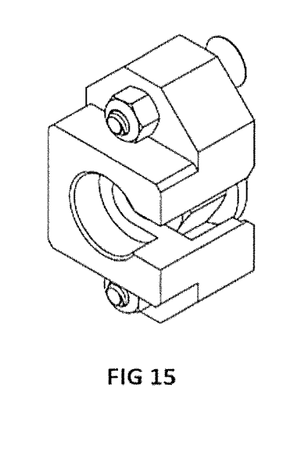
FIG. 15 is an isometric view of a further embodiment of a second connection segment.
Figure 16:
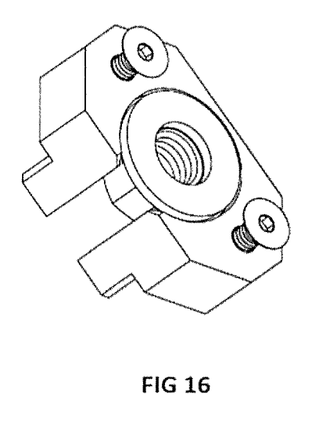
FIG. 16 is a further isometric view of the second connection segment of FIG. 15.
Figure 17:
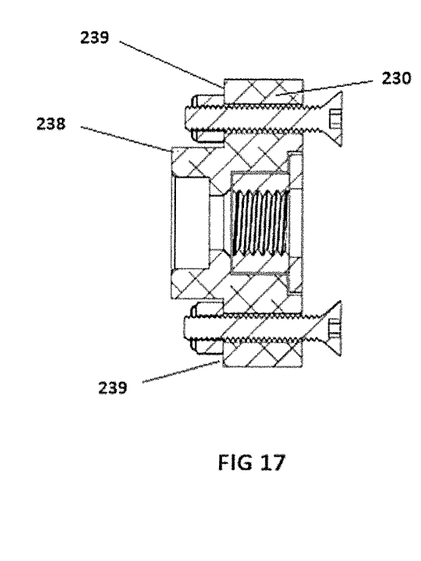
FIG. 17 is a side sectional view of the second connection segment of FIG. 15.

With reference to FIGS. 15, 16 and 17, the same embodiment may be used as a second connection segment with a captured nut. Similar to the further embodiment of the first connection segment 220, second connection segment 230 comprise depressions 239 and an elevated surface 238. Nuts 60 or other means 70 of fastening the connection segment to the truss may be contained within the depression 229.

Although embodiments have been described above and are illustrated in the accompanying drawings in order to be more clearly understood, the above description is made by way of example and is not meant to limit the scope of the present disclosure. It is contemplated that various modifications apparent to one of ordinary skill in the art could be made without departing from the scope of the disclosure which is to be determined by the following claims.

The invention claimed is:

1. A connection apparatus for attaching a first truss to a second truss, the connection apparatus comprising:
   a bolt comprising:
      a threaded end;
      a head end opposite the threaded end; and
      a shank between the head end and the threaded end;
   a first connection segment for attaching to the first truss, comprising:
      an aperture dimensioned to receive therethrough the threaded end and the shank of the bolt;
      a side opening, open to the aperture, dimensioned to receive the shank of the bolt; and
      a shoulder portion within the aperture dimensioned to closely fit around the shank of the bolt and prevent the threaded end of the bolt from passing therethrough,
      wherein when the threaded end and the shank of the bolt is positioned through the aperture, by passing the shank of the bolt through the side opening, the bolt being restricted from axial movement relative to the first connection segment by the shoulder portion; and
   a second connection segment for attaching to the second truss, comprising:
      a threaded hole dimensioned to fixably receive the threaded end of the bolt.

2. The connection apparatus of claim 1 further comprising a coil spring, the coil spring having an interior, a first end and a second end, the coil spring wrapped around the bolt shank constrained between the shoulder of the first connection segment and head end of the bolt and biasing the head end of the bolt away from the first connection segment.

3. The connection apparatus of claim 2, further comprising a recess formed within the aperture by the shoulder portion, the spring constrained within the recess restricting lateral movement of the spring and bolt relative to the first connection segment.

4. The connection apparatus of claim 1, wherein the bolt is removable from the first connection segment when the first connection segment is not fixed to the first truss by axially moving the bolt and laterally sliding the bolt through the side opening.

5. The connection apparatus of claim 1 wherein the second connection segment comprises a recess for receiving a nut, the nut comprising the threated hole, the recess preventing the full rotation of the nut.

6. The connection apparatus of claim 5, wherein the second truss comprises a surface on which the second connection segment is attached, and wherein when the second connection segment is attached to the second truss, said surface and the recess of the second connection segment capture the nut.

7. The connection apparatus of claim 1, wherein first connection segment is integral with the first truss, and the second connection segment is integral with the second truss.

8. A truss section comprising:
   at least one first connection segment assembly for connection to a corresponding second connection segment on a second truss section, each of the at least one first connection segment assemblies comprising:
      a bolt comprising:
         a threaded end;
         a head end opposite the threaded end; and
         a shank between the head end and the threaded end;
      a coil spring having an interior aperture for receiving the threaded end and the shank of the bolt, wherein the spring is dimensioned to prevent the head end of the bolt from passing through the hollow central aperture, and the spring comprises a first end for engaging the head end of the bolt and a second end;
      an aperture dimensioned to receive therethrough the threaded end and the shank of the bolt, the aperture being dimensioned to prevent the head end of the bolt from passing therethrough, and the aperture comprising a recess for receiving the second end of the spring;
      a side opening dimensioned to receive the shank of the bolt; and
      a shoulder portion within the aperture dimensioned to closely fit around the shaft of the bolt and prevent the threaded end of the bolt to pass therethrough,
      wherein when the threaded end and the shank of the bolt is positioned within the hollow portion of the spring and the second end of the spring is positioned within the recess of the first connection segment, the bolt and spring are restricted from axial movement relative to the first connection segment by engagement of the first end of the spring with the head end of the bolt and the second end of the spring with the recess of the first connection segment, the bolt and spring are further restricted from lateral movement relative to the first connection segment by engagement of the second end of the spring with the recess of the first connection segment,
   wherein each of the corresponding second connection segments comprise an aperture dimensioned to receive therethrough the threaded end and the shank of the bolt, the aperture further comprising a threaded hole dimensioned to fixably receive the threaded end of the bolt, and
   whereby when the bolt is tightened to the threaded hole, the head end of the bolt engages an outer surface of the body of the second connection segment, the bolt is prevented from rotational or axial movement and the first and second connection segments are fixed relative to each other.

9. The truss section of claim 8, wherein the bolt is removable from the first connection segment by compressing the spring and axially moving the bolt to disengage the spring from the recess, and laterally sliding the bolt through the side opening, when the first connection segment is not fixed to the truss section.

10. The truss section of claim 8 wherein the second connection segment comprises a recess on a surface of the second connection segment which faces the second truss section, and wherein the aperture of the second connection segment captures a nut positioned within the recess, preventing the rotation of the nut.

11. The truss section of claim 10, wherein the second truss section comprises a surface on which the second connection segment is attached, and wherein when the second connection segment is attached to the second truss, said surface and the recess of the second connection segment capture the nut.

* * * * *